Oct. 3, 1967   M. M. STERNAU   3,344,912
CLOSURES

Filed July 1, 1964   5 Sheets-Sheet 1

INVENTOR.
MARTIN M. STERNAU
BY
C. E. Parker
ATTORNEY

Oct. 3, 1967  M. M. STERNAU  3,344,912
CLOSURES
Filed July 1, 1964  5 Sheets-Sheet 3

INVENTOR.
MARTIN M. STERNAU
BY
C. E. Parker
ATTORNEY

Oct. 3, 1967 M. M. STERNAU 3,344,912
CLOSURES
Filed July 1, 1964 5 Sheets-Sheet 4
FIG. 13
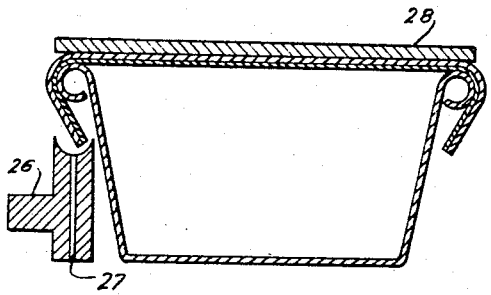
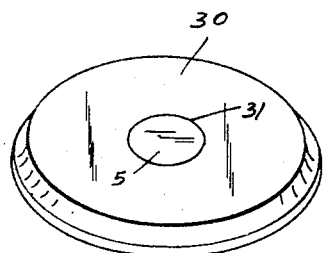
FIG. 14
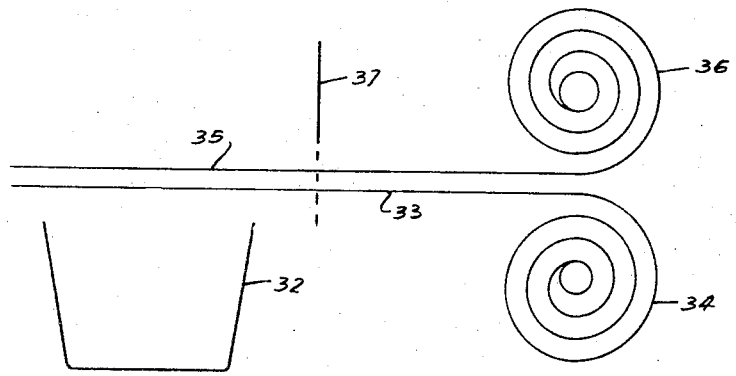
FIG. 15
INVENTOR.
MARTIN M. STERNAU
BY
C. E. Parker
ATTORNEY Oct. 3, 1967    M. M. STERNAU    3,344,912
CLOSURES
Filed July 1, 1964    5 Sheets-Sheet 5

INVENTOR.
MARTIN M. STERNAU
BY
C. E. Parker
ATTORNEY

United States Patent Office 3,344,912
Patented Oct. 3, 1967

3,344,912
CLOSURES
Martin M. Sternau, Flushing, N.Y., assignor, by direct and mesne assignments, to W. R. Grace & Co., Duncan, S.C., a corporation of Connecticut
Continuation of application Ser. No. 653,227, Apr. 16, 1957. This application July 1, 1964, Ser. No. 381,290
16 Claims. (Cl. 206—46)

One of the objects of my invention is to provide a closure, which is an inexpensive, simple hermetic seal for a container irrespective of whether the container is made of paper, plastic, aluminum, steel, etc.

This application is a continuation of application Ser. No. 653,227, filed Apr. 16, 1957, now abandoned, and a continuation-in-part of application Ser. No. 591,628, filed June 15, 1956.

Another object of my invention is to provide a hermetic seal for a container irrespective of whether the container is made of paper, plastic, glass, aluminum, steel, etc.

Another object of my invention is to provide a 2-part closure comprising an inner sealing closure and an outer protective closure.

Another object of my invention is to provide a closure formed from a transparent oriented plastic sheet alone, or from two dissimilar materials, the inner component being formed of a transparent oriented plastic sheet and the outer component being formed of a semi-rigid, moldable material.

Another object of my invention is to provide a sealing closure that will permit removal and replacement of the outer cover whereby inspection of the contents of the container may be made without breaking the seal of the inner component, thereby eliminating the danger of contamination.

Another object of my invention is to provide a two-part or three-part closure comprising an inner stiffening component and an outer sealing closure with or without a further protective covering for the sealing closure.

Another object of my invention is to provide a closure which will enclose the rim of the container in a sanitary manner.

Another object of my invention is to provide a closure which will reduce the cost of manufacture of the container by reducing the amount of container material required.

Another object of my invention is to provide a closure which will accept, respond, and reshape itself to conform to deforming forces upon the container, closure, or upon both, without damage to or loss of seal originally obtained.

Another object of my invention is to provide a closure which will deform due to reduced or increased pressures without damage to or loss of seal thereby reducing the hazard of deformation or breakage of the container due to said varied pressures.

Another object of my invention is to provide a closure which will materially strengthen the container upon which the closure is sealed to resist deformation and withstand shock.

One of the aspects of this invention is a closure made of flexible and moldable material, and particularly a closure having a beaded and expansible rim.

One of the objects of my invention is to make an improved closure, with or without an inside cover of plastic material, in which the rim is pleated before being formed or rolled in such a manner that expansion and contraction at the rim area may occur to receive and to hold the slightly larger bead on the mouth of a container by locking the rim of the closure below the bead of the container.

Another object of my invention is to provide a method and apparatus for forming the cover and for positioning the cover on a container.

Another object of my invention is to provide a method of holding or retaining transparent, oriented plastic sheet material during conversion into a hermetic sealing cover on a container.

Another object of my invention is to provide a method of sealing a plastic sheet closure on a container.

Another object of my invention is to provide a method of manufacturing a hermetically sealing cover from basic raw sheet materials directly upon the container upon which it shall be used and at the time of closure of the container, using the container as the male forming component of the closure.

Another object of my invention is to provide a heat sealing closure for a container.

Another object of my invention is to provide a construction of materials which includes a shrinkable film that may be manufactured into a hermetic closure prior to or during application on the container.

A still further object of my invention is to provide a cord to tear open either the plastic film or both covers when a two part closure is used.

A still further object of my invention is to provide additional sealing means in case additional sealing insurance is desirable.

With the foregoing and other objects in view as will appear from a reading of the following specification and claims, the invention resides in the novel arrangement and combination of parts and in the details of construction and process of manufacture hereinafter described and claimed, it being understood that changes in the precise embodiment of the invention may be made within the scope of what is claimed without departing from the spirit of the invention. It will be further understood that the invention is susceptible of embodiment in many and various forms, some of which are illustrated in the accompanying drawing, and that the structural details of particular steps of the method herein set forth may be varied to suit particular purposes and still remain within the inventive concept.

Referring briefly to the figures:

FIGURE 13 shows a different type apparatus for applying heat to the closure to shrink the inner layer of the closure after crimping;

FIGURE 14 illustrates a 2-ply closure with an inspection hole in the outer layer;

FIGURE 15 illustrates a straight sided container having a plain, unrolled edge being covered with a modified 2-part closure formed from two rolls of materials;

This invention is for a system providing a closure of circular, rectangular, hexagonal, or any other shape for a receptacle. The closure consists of a combination, laminated or otherwise physically held in approximately uniform parallel position, of an inner or underside cover of a shrinkable and clear, translucent, or opaque, film or sheet of various materials, and an outer cover of a moldable, rigid, or semirigid, and clear, translucent, or opaque material, such as aluminum, paper, plastic, glass, steel, etc., or combinations thereof. The inner cover is to provide a seal for the container on which the closure is used, and the outer cover is to provide a mold or retaining device or shield for the former during the sealing operation, and to provide an ultimate protecting cover for the inner cover and for the container upon which this closure is used.

As one example, the outer cover of the closure possesses a peripheral flange formed prior to, or during, the operation affixing the closure cover or covers to the container and having applied at its outer rim or edge means wherein both components of the closure are rolled, curled, bent or otherwise temporarily or permanently held together so that the inner component of the closure is held or retained by or within the rim of the outer component. The securing together of the two covers or components is done prior to, during, or after the sealing operation.

Figure 2:
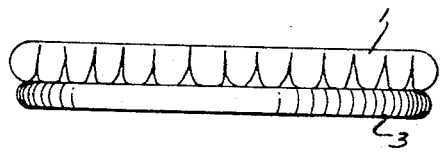
FIGURE 2 shows a 2-ply closure according to the invention ready for use.

There are any number of possibilities by which a closure as outlined above may be put into a practical form, for instance:

(1) A closure may be made as shown in FIG. 2 comprising plies of dissimilar materials, the inner layer consisting of a transparent film shrinkable under heat application, the outer layer made of aluminum sheet or any other moldable material. Both components are formed into a cover having, as one example, a circular top portion and an integral peripheral flange and a beaded rim. If this type closure is snapped onto a container with a beaded or a plain edge, the bead of the closure will be locked circumferentially below the rim of the container. When heat is applied to the rim of the closure or to the container, or to the covered container, the following takes place:

(a) The film will primarily shrink a maximum distance circumferentially around the rim of the container due to more rapid heat absorption of the exposed, uncovered, or unshielded film at this general area, with the result that:

(b) It will pull the beaded rim of the outer layer of the closure tighter around the circumference below the bead of the container. This occurs because both elements are engaged at the rim area thereby making the outer cover tighter on the container.

(c) The shrunken film at the rim will conform to the shape and irregularities of the container rim creating an additional seal around the rim of the container.

(d) Due to this primary local shrinkage around the rim, lip, or edge of the container, the entire inner component is fastened or anchored at the rim, lip, or edge, and the remainder of the film is pulled tightly across the mouth of the container, creating a closure which, being so created, is in constant tension, said tension thereby further tightening and improving the seal at the edge of the container and said tension further strengthening the container against deformation by pulling equally at all points at the container edges towards the center of the closure. This tension in the film is further increased by any secondary heat absorption in the portion of the film covering the mouth of the container, still further improving the seal at the mouth of the container.

(e) A properly selected wax, heat sensitive cement or heat softening material can be applied to the cover near its rim or to the rim of the container before attaching the cover. When heat is applied, this wax will melt simultaneously with the shrinking of the film, the film enveloping the rim of the container, and the melting wax, etc. being drawn by capillary action into any surface irregularities at the rim of the container and therewith form or assist in forming a leakproof s*

Similarly, the above function takes place with different type closures used on different type containers, and for specialized contents. For example, in sealing the closure on containers containing frozen foods, the seal may be made by passing the closed container through a heated oven. The system being at a lower temperature, a greater amount of time or heat will be required to reach the shrinkage temperature of the film. That area capable of most rapid heat absorption and therefore that area where shrinkage conditions will first be reached is the rim circumference of the closure since at this point the film is relatively exposed and not shielded. In passing through an ambient hot air oven, this exposed rim portion of the film will require less time to reach shrinkage temperatures, thereby permitting the seal to be made at the rim of the container, which may or may not be followed by tightening of the film across the entire mouth of the container. To create a closure in further tension, additional film tightening is accomplished by additional heat application over the entire area of the cover or film. This additional heat application may be accomplished by an increase in temperature or an increase in time.

Figure 1:
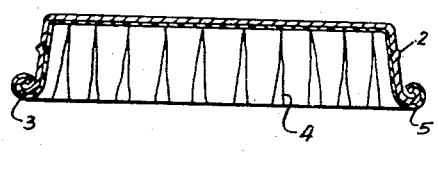
FIGURE 1 illustrates a 2-ply closure in a vertical sectional view.

(2) A cover may be made as shown in FIGURE 1, for example. This cover has a peripheral crease to facilitate the formation of a peripheral bulge (FIG. 2) before the closure is snapped onto the container. A closure as shown in FIGURE 1 has the advantage of economical space saving stacking for packaging.

(3) A closure may be made using an outer single-ply cover of aluminum, or paper, etc., as a retainer or shield or both for a shrinkable plastic sheet, said sheet being larger than the mouth of the container. The plastic sheet is placed on top of the container, and the cover snapped onto the container. This will create the essential condition that the film is held substantially flat across the mouth of the container, while the edge of the film is arranged around the rim of the container in pleats protruding beyond the outer cover. When heat is applied to the rim of the container the protruding film will shrink and will conform to the shape of the rim of the container. Hence, a tight seal is formed around said rim, while the remainder of the film is pulled tightly across the mouth of the container. If additional heat is subsequently applied over the entire area of the closure, further tightening of the seal will result. This method has the advantage that the outer cover can be removed without disturbing the seal of the film portion of the closure. This process has the additional advantage that the outer cover can be repeatedly taken off and snapped back onto the container without losing is original efficiency of snapping onto the container, and locking below its rim due to its expandable pleated rim. Furthermore, the outer cover may be used to recap the container after part of the contents have been removed.

(4) A closure may be made as shown generally in FIG. 1 or FIG. 2 but with the outer cover 30 having a hole 31 in the center for visual inspection through the transparent inner cover 5 without removing the cover or breaking the seal, all as shown specifically in FIG. 14.

Figure 16:
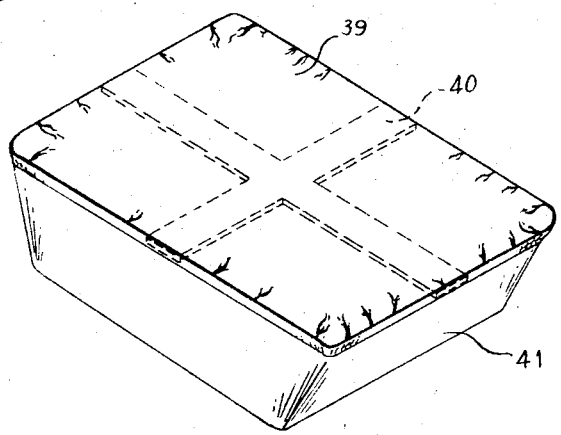
FIGURE 16 is a perspective view of a modified form of my closure wherein a stiffening element is used to reinforce the rim of the container as well as the plastic cover.
Figure 17:
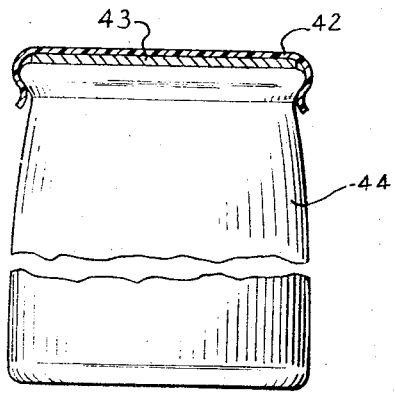
FIGURE 17 illustrates a similar construction in which the reinforcing element rests on the rim of the container.

(5) A closure may be made as shown in FIGS. 16 and 17. In this modification, the heat shrinkable cover may be provided with a secondary inner layer, consisting of a moldable or rigid material, such as cardboard or plastic, suitably attached to the heat shrinkable film. This inner layer is designed to fit inside the container rim as, for example, in FIG. 16, so that, when heat is absorbed during sealing, the closure will shrink around the rim of the container as described in paragraph 3 above, to form a sealing closure. The cardboard, plastic, etc. will act as a stiffener or brace for both closure and container. This is of advantage in particular on oblong containers, where the long side of the container rim or side may tend to buckle under the tension of the shrinking film, in which case the stiffener will prevent this from happening. Also, the reinforcement may lie over the rim of the container as in FIG. 17, in which case it will stiffen only the plastic cover and not the container proper. This stiffener may be shaped in the form of a single rib, cross, disc, or any other suitable configuration. Obviously, an outer protective cover may also be used if desired.

(6) A closure may be made by using a shrinkable film in combination with a two-ply moldable material, such as aluminum foil laminated with paper, as it is used for example on milk bottle tops. If such a three-ply closure is placed, for example, over the top of a milk bottle, with the heat shrinkable film on top of the outside of the 2-ply material (or on the inside if the entire combination is laminated together) and retained while heat is applied at the rim of the container, the film protruding beyond the moldable material will shrink around the rim of the milk bottle, which will result in a crimped cap on the bottle.

Figure 10:
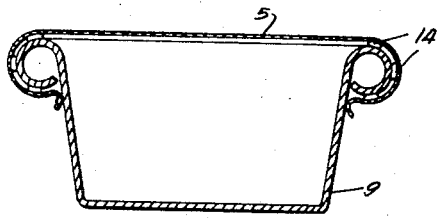
FIGURE 10 shows additional sealing cement, or wax, beneath the sealing cover.
Figure 9:
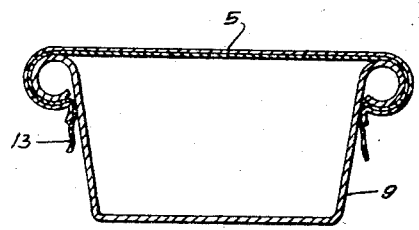
FIGURE 9 shows a single cover which has an opening string beneath it.

It is not necessary, but if desired, as shown in FIG. 10, a wax, or cement, or some other sealing medium 14 may be applied to the cover or to the container prior to or during the sealing operation, and said material will adhere to the shrinkage or shrunken film during the heat sealing operation and thereby provide double protection against leakage. Also, any of the covers may have incorporated a means of tearing, or otherwise removing said sealed film cover by means of a string, band, etc. 13 by having this device incorporated into the cover construction prior to or during the sealing operation as shown in FIG. 9.

Since the rim of the plastic film portion is generally rolled into the rim of the aluminum portion of the closure, it is locked and retained by the aluminum portion of the cover. Or, if preferred, additionally or alternatively, the film may be bonded or glued to the aluminum peripherally at the rim. Consequently, when this cover is snapped on an aluminum container, and heat is applied to effect selective shrinkage of the cover, the plastic film portion will primarily shrink a maximum amount circumferentially around the rim of the container due to the cover design. Thus it will take the shape and configuration of the rim of the circular, rectangular, or other shape of the container, and create therewith a leakproof seal around the rim.

It is a novel feature of this invention to place a sheet of shrinkable, oriented plastic film on top of a paper, plastic, aluminum sheet or foil container and to retain and shield it by means of any outer cover and, by subjecting it selectively to heat, to shrink it around the mouth of the container thereby forming a leakproof, dome shaped, removable and reappliable cover. Because of the particular design or construction of the closures described above, selective heating causing selective shrinkage is also inherently present when overall heat is applied for the following reasons:

In a closure wherein the heat-shrinkable film protrudes beyond the rim of the container in combination with the retaining and shielding snap-on cover as previously explained, if this cover-film-container system is subjected to overall heat, it is obvious that the protruding unshielded film will be affected by heat application first. This occurs since the protruding edges are the only portion of the film component of the cover which is not shielded from the heat application by the outer component and the container. In consequence thereof this portion will shrink first i.e., before the rest of the film which is shielded by the retaining cover and the container, reaches the shrinkage temperature, so that selective shrinkage is effected.

Similarly, selective heating causing selective and controlled shrinkage will result through overall heat application on a two-ply cover, where the film is rolled together with the outer ply at the rim, as shown in FIG. 1. In this type cover that portion of the film which is not shielded, i.e., exposed, and capable of absorbing heat before those portions of the film that are shielded, is located circumferentially below the rim of the container at the area where the seal will occur. As a result of this two-ply closure also selective heating and selective shrinkage are obtained, although overall heat application may be employed. The same holds true to a greater extent, if the contents of the container are frozen, since selective heating by overall heat application and consequently selective shrinkage becomes more pronounced.

A closure may be made containing a heat shrinkable component as heretofore described, which, because of active tension in the shrunken film will accept, respond to, or reshape itself to conform with deformation of the container, closure, or both without damage to or loss of seal originally obtained. Similarly this closure can deform to accommodate reduced or increased pressures within the container-closure system, upon which the closure is used.

Closures embodying a heat shrinkable component as heretofore described will impart added strength and rigidity to the container, closure, and seal by utilizing physical forces that are developed by shrinkage of the film. The film component, upon being tightened during shrinkage, is in a state of tension, in which condition active radial compressive forces are created upon the rim of the container. These compressive forces cause reactive expansive outward forces. A stable equilibrium is established between these forces and in consequence thereof added rigidity is imparted to the closure, the container, and to the seal.

FIGURE 1 shows an outside cover somewhat similar to the cap illustrated in my previous invention, United States Patent No. 2,756,921, granted July 31, 1956, upon which this is, in certain respects, an improvement. Among other things, the invention as illustrated in FIG. 1 is directed to a more or less loose roll or double fold of the rim, whereby the pleated area in the rim is freely able to expand and contract as the cover is slipped over the mouth of the container. The loose roll or fold of the rim obviously could involve a plurality of complete turns rather than one as shown. Also, a thin plastic film cover may be applied, if desired, in connection with the outer cover.

Numeral 1 represents the rigid cover made of flexible moldable material, such as aluminum, paper or plastic, while 2 indicates the crease formed in the flange of the cover and 3 indicates the more or less loose roll of the rim. Obviously, edge 3 may be formed with a double fold rather than a loose roll, the main consideration being that the edge be expansible and lock beneath the edge of the container. Numeral 4 indicates the pleats which are formed in the flange of the cover and 5, if a liner is used, illustrates such liner or inside cover.

Upon the application of pressure before or as the cap is being secured to the container, due to the crease, the bulge will be formed, as clearly illustrated in FIG. 2.

Figure 6:
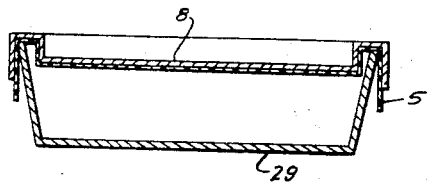
FIGURES 3, 4, 5 and 6 show various types of protective covers which shield the inside sealing cover on different type containers.
Figure 5:
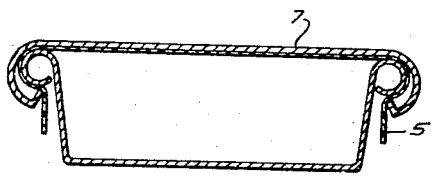
Figure 3:
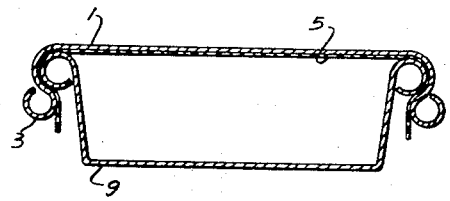
Figure 4:
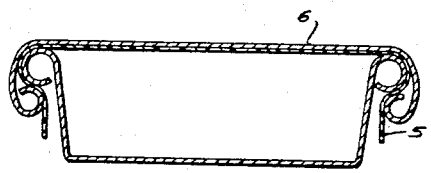

FIGURES 3 to 6 indicate various types of closures, in which numeral 5 illustrates the inside plastic cover with various types of outside protective covers such as cover 1 in FIG. 3; cover 6 in FIG. 4; cover 7 in FIG. 5; and cover 8 with a central depressed portion in FIG. 6. These covers may be placed on dissimilar type containers 9, 29, etc. Clearly, the two covers or the plastic film alone may be laid flat over a straight sided container as shown in FIG. 15.

Figure 7:
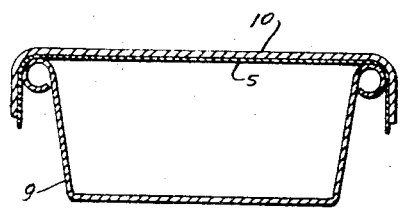
FIGURES 7 and 7A show another type closure before and after beading same together with container.
Figure 7A:
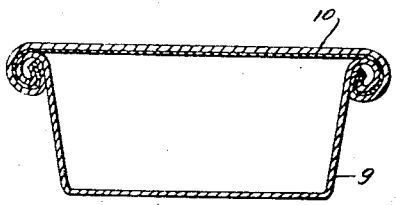

FIGURES 7 and 7A illustrate a plastic film cover 5 and protective cover 10 placed over container 9. Subsequently these covers are crimped around to make a tight closure, as illustrated in FIG. 7A, and heat is then applied, to cause shrinkage around the rim.

Figure 8:
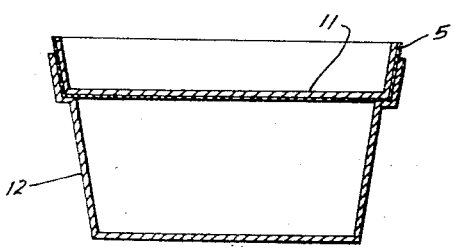
FIGURES 8 and 8A show a similar type of 2-part closure before and after crimping to the container is accomplished.
Figure 8A:
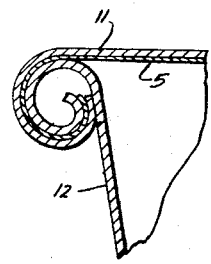

FIGURES 8 and 8A depict a straight edge container 12 having an inside plastic cover 5 and a recessed closure 11 applied over the top of the inside cover, before and after, respectively, the rolling, beading or crimping and heat sealing operation.

FIGURE 9 shows the container 9, in which only a 1-part closure or transparent plastic cover 5 is applied to the container, and secured thereto is an opening string 13. This type closure is ideally suited in a circular container for bakery goods, such as, cakes, and pasteries, or in a rectangular package for food products.

FIGURE 10 shows a plastic sheet 5 secured to container 9 with additional sealing cement, wax, or other bonding media 14 at various spots, or completely around the edge of the closure or the container. Obviously, the opening means of FIG. 9 could be applied to the closure of FIG. 10 or any other figures, with or without the outside cover, and likewise, the sealing cement 14 of FIG. 10 could be applied to the other constructions.

FIGURES 11, 11A, 12, 13 and 18 illustrate the dies which can be used in making the cover and the heads in sealing the container as set forth in applicant's invention.

Figure 11:
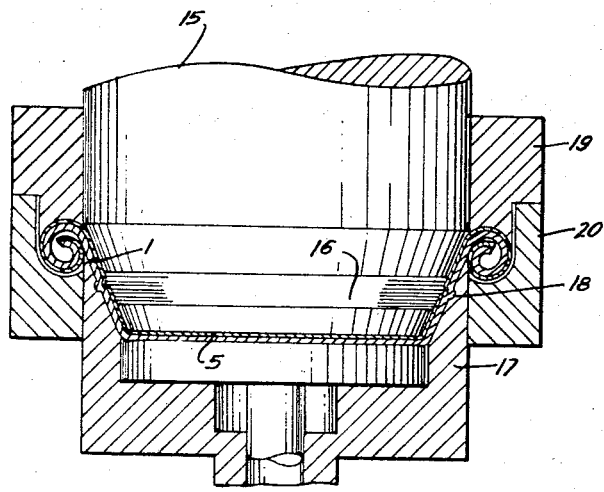
FIGURE 11 illustrates a forming apparatus with curling rings, a 2-piece male die having a resilient ring in it (which may be omitted), to form a peripheral crease or indentation in the sidewall of the closure, and a female die having a peripheral groove for providing said indentation.

FIGURE 11 shows a male die 15 (illustrated in greater detail in FIG. 18) having a resilient ring 16 therein. Female die 17 has a groove 18 opposite the resilient ring 16 in the male die. Upon pressure being applied by the male or forcing die, the closure being formed is forced into the groove by means of the elasticity of the resilient material to form the crease. At the same time, curling rings 19 and 20 form the rim of the cover. The resilient ring 16 may be omitted if desired, but then a less pronounced crease will be formed.

Figure 18:
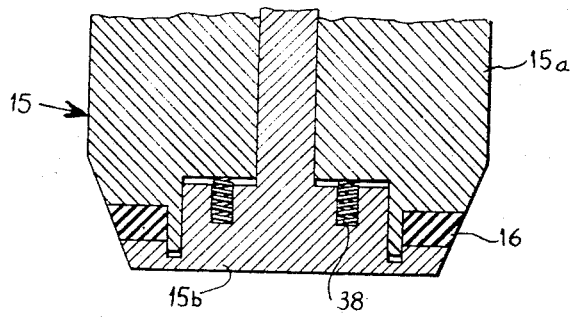
FIGURE 18 shows the details of the male die of FIGURE 11.

FIGURE 18 illustrates the details of the male forming die 15, which comprises a pressure member 15A and a head member 15B, normally separated by springs 38. In operation springs are compressed and since the resilient member 16 is restrained on 3 sides, it is forced outwardly against the female die in the general area of the groove of the female die, forming therefor the peripheral crease in the side wall of the closure.

The 2-part closure of FIG. 11, for instance, is then picked up by the suction in the capping and sealing tool 21 (FIG. 11A) which has a suction line 22 therein, and as the container 9 is snapped beneath the formed cap, or vice versa, heat is applied to the rim of the closure through apertures 23A. The heat may be applied by hot air, hot water, steam, electricity, or even by an open flame. The application of heat will cause the oriented plastic film to shrink around the rim of the container and therefore form a tight, leakproof seal. Tools 21 and 23 are made of asbestos, hard rubber, etc. in their entirety or at least surrounding the heat passageways.

Figure 12:
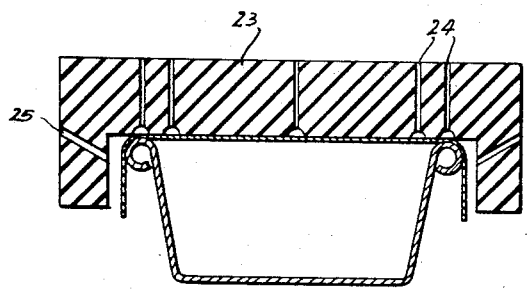
FIGURE 12 shows a sealing head which carries the shrinkable film and seals it to the receptacle.

FIGURE 12 shows a different type of suction sealing disc 23 having suction lines and positioning lines 24 in it. While FIG. 12 shows only a shrinkable film being placed over the receptacle and sealed by means of hot air or steam passing through apertures 25 simultaneously or separately, it is clear that a 2-part closure could be just as easily used. Hot air could be applied through the apertures at the side first and then through the aperture at the top, or in certain cases be applied at the side and at the top simultaneously. Obviously, any number or spacing of the holes could be used around the side and on the top.

FIGURE 13 shows a different type of crimping and sealing device 26 having hot air apertures 27 therein and a hold-down plate 28.

FIGURE 14 illustrates my invention with a different type closure having a body portion 30 with an opening 31 in the center by means of which the contents of the container may be seen through the plastic inner cover 5.

Figure 11A:
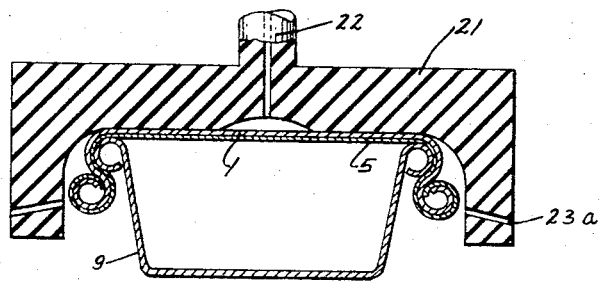
FIGURE 11A shows a capping and sealing tool for snapping the cover over a receptacle and retaining it while heat is applied to seal the inner cover.

FIGURE 15 shows a roll 36 of outer protective material 35, and a roll 34 of inner transparent shrinkable film 33, both of which are positioned over a straight, non-beaded, circular or rectangular container 32. A shears 37 cuts both layers of the material in cooperation with a heat sealing and crimping device; for example, as shown in FIG. 11A. The shears may be combined with the heat sealing and crimping device if desired so as to provide a one-motion operation for sealing a container from basic sheet material. Similarly, the two components of the closure may be fed from one roll, having been re-rolled onto the single roll in a prior operation.

FIGURE 16 shows a plastic film 39 having a cross type reinforcing and stiffening member 40 secured to it. The member may be a narrow rib in one or both directions, i.e., cross, a ring or any shape of paper, cardboard, plastic, etc. As the plastic film is contracting, the thin walls of the container 41 will move inwardly until the stiffening member is abutted. The stiffening member (or members if two or more separate pieces are desired) obviously must be below the rim of the container in this type construction and is particularly useful in long sided rectangular containers. Nevertheless, in any container a thinner gage material may be used and savings effected.

FIGURE 17 illustrates a modification of FIG. 16 but in this modification the reinforcement member 43 only protects the plastic seal 42 and does not stiffen the container 44 since the stiffening rib, cross, ring (with or without a viewing center), etc. rests on the rim of the container. This type construction could also be used to pull a two-ply moldable material around the rim of a container or bottle and thereby produce a two-ply crimped cover for the bottle and at the same time provide an outer sealing member.

It is therefore clearly apparent that I have invented a sanitary cover, which will decrease the quantity of, for example, aluminum, to pack a certain amount of goods. This is true, because in the ordinary inside friction closure, sealed on an inwardly extending rib from the top, approximately 8% of the normal capacity of the container is wasted. With this flexible transparent film across the very top, the entire container may be utilized. This is particularly so in aluminum packaging, which is becoming so common today. Also connected with this sanitary feature is the sales appeal of transparent closures, in which the public demands to see what they are purchasing, especially in the food field.

It is also apparent that I have invented a closure which creates a seal that permits a wider degree of crushing or deformation of the container or its rim that heretofore permissible with other closures. This is evidenced by the fact that a crushing action on the container-closure system could be accompanied by a corresponding contraction in the film due to inherent tension, which tends to reduce the size of the film at any and all times, such action being without damage to the seal. Also apparent is the fact that deforming forces upon the film may occur without changes to the seal even though they may damage the outer layer of the two-ply closure. This is because, in a two-ply closure, as per FIG. 1, the inner film ply is free to move independently of the outer ply, since the only point of physical attachment is at the rim areas of the closure. Similarly, in a closure as in FIG. 3, where there is no rolled edge, the seal is not damaged by deformation.

This tolerance of the closure, to retain its effectiveness, despite abuse which causes deformation of the container and the cover, and changes in pressure due to changes in temperature of the food or other contents, or to atmospheric changes in pressure due to means of shipments (air transportation; use by military forces in tropics or Antarctic; etc.) is very important. For example, food may be steamd and cooked (or frozen) and then packaged in the container and the closure immediately applied, or food at room temperatures could be packed and then steamed and the container sealed. Because of the built-in tension, elasticity, and flexibility of the cover over a wide range of pressure changes, the cover will remain sealed.

My invention may be used either as a 1-stage or a 2-stage operation. In other words, the transparent film 10 may be used alone or the outside cover may be used alone, or if the combination closure is used, the inside cover may be first applied and then the outside cover applied later, or, in a more practical way, the two covers may be formed together and applied as a laminated unitary closure.

My invention is particularly applicable when using heat shrinkable films that are normally less than .002″ thick and capable of large shrinkage in all directions parallel to the film surfaces. Actually films in the range of .0002″ (20 gauge) to .0008″ (80 gauge) are generally satisfactory and may be used. The thickness of the film, of course, will depend somewhat upon the area to be covered. However, it is within the scope of my invention to use a film that is shrinkable in only one direction (e.g. an oriented film of the so called tensilized or cross tensilized type) which could be used on containers of particular form, such as on a rectangular container. Examples of certain films which could be used are oriented films of rubber hydrochloride (oriented "Pliofilm," such as "Snug-Pak") or of vinylidene chloride (oriented Saran, such as "Cryovac"), which are heat shrinkable by reason of their oriented internal structure commonly induced by stretching the same unidirectionally or multidirectionally while heated or supercooled. Obviously, the "orienting" of such films may be done by mechanical, pneumatic, or other physical methods of expanding or stretching the films, or by chemical or other means of realigning the molecular arrangement.

By way of example, the best degree of seal, especially on containers with circularly shaped mouths, may be assured through the use of internally oriented plastic films capable of linear shrinkage of 50% in all directions parallel to the film surfaces upon heating to temperatures between 160° and 220° F. One type of such material is standard "Snug-Pak" of 40, 50 and 60 gauge, sold by Tee-Pak, Inc., which is stretched to twice its width and to twice its length whereby to quadruple the area and to subsequently shrink down to ¼ of the original stretched area. "Pliofilm," made by Goodyear Tire & Rubber Company, for example, may be stretched appreciably more or appreciably less and consequently will be capable of shrinking more or less than standard "Snug-Pak." These percentages of shrinkage and temperature are by way of illustration only and may be varied within wide limits. Obviously, the shrinkage temperature will vary for different heat shrinkable films. Also, in all or practically all of the oriented films, the shrinkage action will take place instantaneously or almost instantaneously.

Films possessing the above-mentioned overall shrinkage properties are desirable in order to produce adequate tightness of seal at the rim of the container where the greatest degree of utilization of the shrinkage property is required locally. It is to be understood, however, that the shrinkage values do not represent the overall reduction in size of the entire film in the closure after heat application, nor the actual shrinkage in producing the seal.

The selection of films of suitable shrinkability, suitable shrinkage temperature and suitable strength will be dictated primarily by the nature of the container or contents and the temperature to which the local area may be heated where seal of closure to container is effected, and such selection may be readily made.

While I have referred to the film as being transparent since that quality would be most desirable in the food packaging field, it is of course understood that a cloudy, opaque, or colored film might be used, and that the color could be included throughout the body of the film or applied to either side. Also, the film might be a single film or a laminated film of 2 plies of material; the principal requirement to accomplish my invention being that at least one of the plies of the film be heat shrinkable and that this ply control the action of the laminated film.

The concept of selective shrinkage of shrinkable film may be defined as the controlled reduction in size of portions of said film to a substantial degree while holding the reduction in size of the balance of the film to a lesser degree or to none at all. This concept applies in the closures herein described through sufficient shrinkage of the film at the rim of the containers to lock and to provide a seal at the mouth of the container while controlling shrinkage across the mouth of the container through the retention of the film at the rim, by shielding, by omitting the shrinkage medium, or by any other means.

It is therefore seen, that there has been provided a leakproof and moisture proof closure, which is easy to manufacture and is inexpensive. While the invention is particularly adapted for outside covers and containers of aluminum, the invention is equally effective for paper, plastic, steel, other metals or materials, etc.

Any of the features shown in one modification may be used in any of the other modifications or combinations illustrated or described. As an example, the sealing means 14, shown in FIG. 10, could be used in FIGS. 16 and 17; an outer protective cover 6, shown in FIG. 4, could be used in FIGS. 16 and 17, etc.

Other modifications of the principal items of this invention are clearly apparent, and I do not desire to be limited in my invention except as set forth in the claims.

The invention claimed is:

1. A closure having a central area for covering a container and a rim area for holding the closure on the container comprising a plurality of layers of closure materials, each layer forming both the central area and the rim area of said closure and being substantially coextensive with the other layers, one of said layers of closure materials being formed from oriented heat shrinkable polymer material shrinkable throughout, and said layers of closure materials being joined solely at their respective edges in the rim area.

2. A closure having a central area for covering a container and a rim area for holding the closure on the container comprising an outer layer of protective moldable non-shrinkable material extending across the central area and forming part of the rim area, and an inner layer of oriented heat shrinkable polymer material shrinkable throughout and extending across the central area and forming part of the rim area, said outer layer and said inner layer being joined solely in said rim area.

3. A closure having a central area for covering a container and a rim area for holding the closure on the container, comprising a plurality of layers of closure materials, one of said layers of closure materials extending across the central area and forming part of the rim area and being formed from thin fragile oriented heat shrinkable polymer film material shrinkable throughout and being fixedly joined solely in said rim area to at least one other layer of closure material extending across the central area and forming part of the rim area whereby the central area of said film material is free to more relative to said other layer of closure material.

4. In an hermetically sealed container for an article packaged therein having an open mouth defined by a peripheral rim, a closure having a central area covering the open mouth of the container and a rim area holding the closure on the rim of the container, said closure comprising a plurality of layers of closure material extending across the central area and forming part of the rim area and including an inner layer of oriented heat shrinkable film material shrinkable throughout and jonied to the other layers solely at the rim area, and a heat shrunk portion of said film material being shrunken in said rim area and stretched tautly across the mouth of said container in said central area and forming an hermetic seal around the rim of the container.

5. A closure having a central area for covering a container and a rim area for holding the closure on the container comprising a plurality of layers of closure materials, an inner layer of the closure material extending across the central area and forming a part of said rim area and being formed from oriented heat shrinkable film material shrinkable throughout, an outer protective layer of closure material extending across the central area and rim area substantially coextensively with said layer of film material, the rim area of said outer protective layer of closure material being resiliently expandable and contractible, the rim area of said film material being arranged in a plurality of pleats and heat shrunk, and the film material being interconnected with the outer protective cover solely in the rim area, said outer protective cover and said inner layer of film material being resiliently removable from and reappliable to said container as a unit.

6. The invention as defined in claim 5 and wherein said outer protective cover is made of metallic material.

7. The invention as defined in claim 5 and wherein said film material is connected to said outer layer of protective material by a rolled edge formed from both materials.

8. The invention as defined in claim 5 and wherein said inner layer of film material is formed only by heat shrinkage.

9. A closure for a flexible receptacle with an open mouth comprising an outer cover made from a moldable non-shrinkable material, an inner cover made from a transparent heat shrinkable film shrinkable throughout both said outer cover and said inner cover having parallel central portions extending across the mouth of the receptacle and skirt portions extending downwardly around the receptacle adjacent the open mouth, and a portion of the skirt of the inner cover being exposed and shrunk into retaining engagement with the receptacle.

10. The invention as defined in claim 9 and wherein the central portion of the inner cover is fully tightened across the mouth of said receptacle, said inner cover being in a state of active tension, and said receptacle being in a state of compression around the open mouth thereby imparting additional strength and rigidity to the rim of the container and to the container proper, said additional strength and rigidity making said container more resistant to deformation and shock.

11. A closure for a container having an open mouth and an enclosing rim comprising a film shrinkable by application of heat in combination with a rigid sheet, said film extending across the mouth of the container, said sheet being attached to said film and being shaped to conform substantially to the open mouth of the container and to fit within the rim of the container, said film being shrunk onto the rim of said container to form a leakproof closure upon said container, and said rigid sheet being located within the rim of the container and engaging the container to provide a brace restraining compressive forces at the rim of the container caused by shrinkage of said film.

12. A package comprising a filled container having an open mouth defined by an enclosing rim and a cover for said mouth made of limp, heat shrinkable oriented plastic film heat shrinkable throughout, a central heat shrinkable portion of said film extending across and closing said mouth, a heat shrunk rim portion only of said film being shrunk onto said rim, and a part of said rim portion being located below the rim of the container and locking the cover on the container, said cover comprising a protective moldable, non-shrinkable material in combination with a thin, transparent, heat shrinkable oriented plastic film, both cover components joined solely at their respective edge areas.

13. A package comprising a filled container having an open mouth defined by an enclosing rim and a cover for said mouth made of limp, heat shrinkable oriented plastic film heat shrinkable throughout, a central heat shrinkable portion of said film extending across and closing said mouth, a heat shrunk rim portion only of said film being shrunk onto said rim, and a part of said rim portion being located below the rim of the container and locking the cover on the container, said cover comprising an inner component made of limp, heat shrinkable oriented plastic film heat adapted to seal said container by selective shrinkage at the rim area of said film, and an outer, moldable, non-shrinkable component, said latter component being removable without disturbing the seal created by the inner heat shrinkable component.

14. A package comprising a filled container having an open mouth defined by an enclosing rim and a cover for said mouth made of limp, heat shrinkable oriented plastic film heat shrinkable throughout, a central heat shrinkable portion of said film extending across and closing said mouth, a heat shrunk rim portion only of said film being shrunk onto said rim, and a part of said rim portion being located below the rim of the container and locking the cover on the container, said cover being formed in situ by fluid convection heat with a thin coating of resinous wax between the plastic film and the rim of the container to more effectively seal said container.

15. A package comprising a filled container having an open mouth defined by an enclosing rim and a cover for said mouth made of limp, heat shrinkable oriented plastic film heat shrinkable throughout, a central heat shrinkable portion of said film extending across and closing said mouth, a heat shrunk rim portion only of said film being shrunk onto said rim, and a part of said rim portion being located below the rim of the container and locking the cover on the container, a reinforcing element being spaced from said film at its central area.

16. A method of forming a cover upon a container and simultaneously sealing a container having an opening at its top which forms a mouth comprising the steps of placing a sheet of thin, flexible, unformed, heat shrinkable, oriented plastic film on top of said container to be sealed and over said mouth, said sheet being heat shrinkable throughout and substantially larger than the mouth of the container and extending beyond said mouth circumferentially, arranging the edge portion of the film which extends beyond the mouth into a depending skirt around the outer rim of said container, applying means to said sheet to retain the same in position over said mouth with its depending skirt in exposed position surrounding said rim while heat is applied to said skirt to obtain shrinkage of said skirt only into engagement with said rim to seal said container.

References Cited

UNITED STATES PATENTS

| | | | |
|---|---|---|---|
| 1,038,023 | 9/1912 | Switzer | 215—83 |
| 1,302,132 | 4/1919 | Christie. | |
| 1,615,504 | 1/1927 | Cohoe | 215—38 |
| 1,879,640 | 9/1932 | Spengler | 215—38 |
| 1,923,091 | 8/1933 | Hoffman | 215—38 |
| 2,374,142 | 4/1945 | Steven | 220—82.5 |
| 2,500,549 | 3/1950 | Ketay et al. | 215—38 |
| 2,734,650 | 2/1956 | Meyer | 215—38 |
| 2,849,149 | 8/1958 | Weldon | 220—82.5 |
| 2,885,105 | 5/1959 | Heyl et al. | 215—38 |
| 2,954,139 | 9/1960 | Owens | 215—38 |

FOREIGN PATENTS

| | | |
|---|---|---|
| 705,816 | 3/1964 | Great Britain. |
| 125,847 | 5/1928 | Switzerland. |

THERON E. CONDON, *Primary Examiner.*

J. M. CASKIE, *Assistant Examiner*